Figure 4:
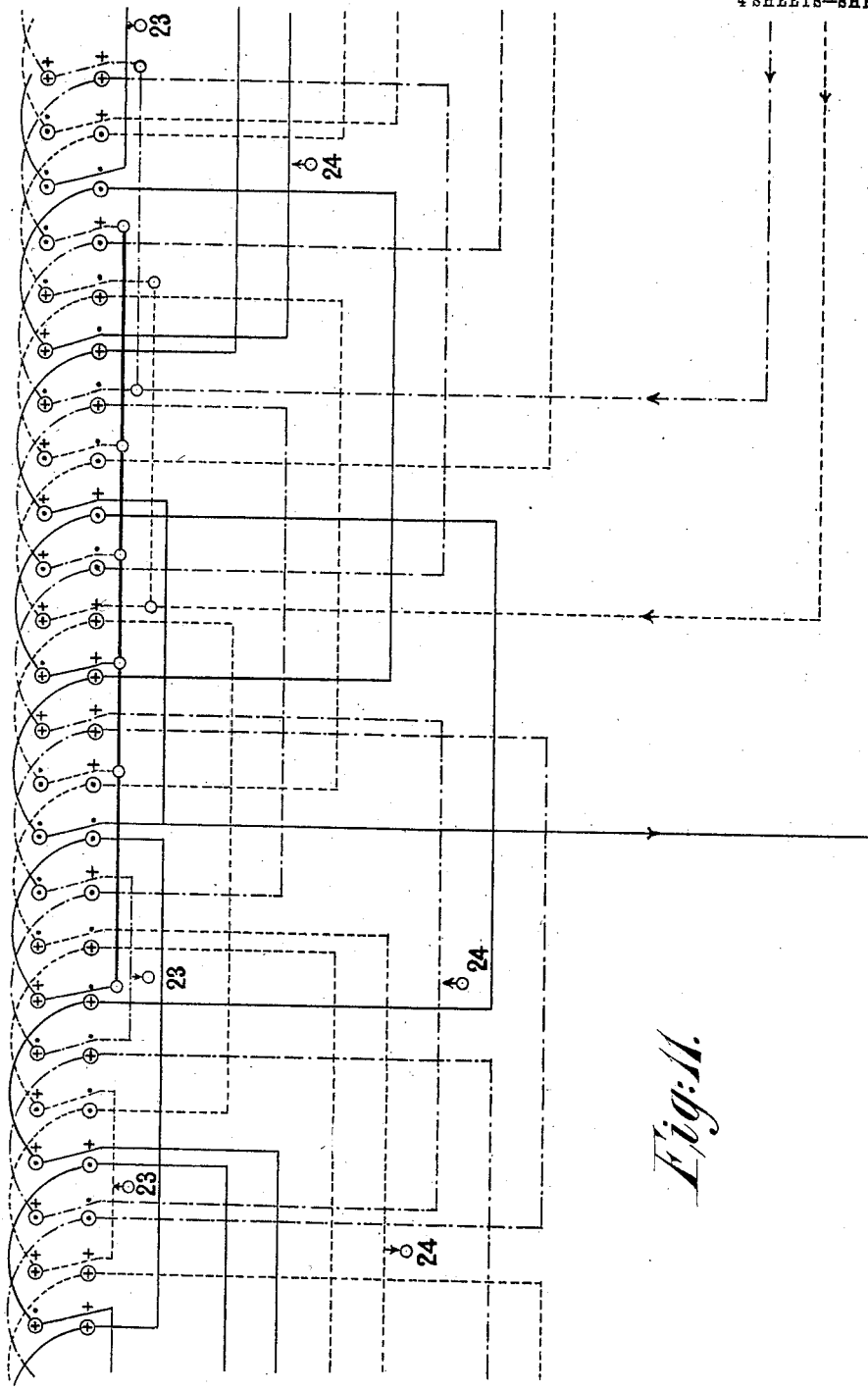

L. J. HUNT.
DYNAMO ELECTRIC MACHINE.
APPLICATION FILED JUNE 22, 1906.
926,192.
Patented June 29, 1909.
4 SHEETS—SHEET 1.
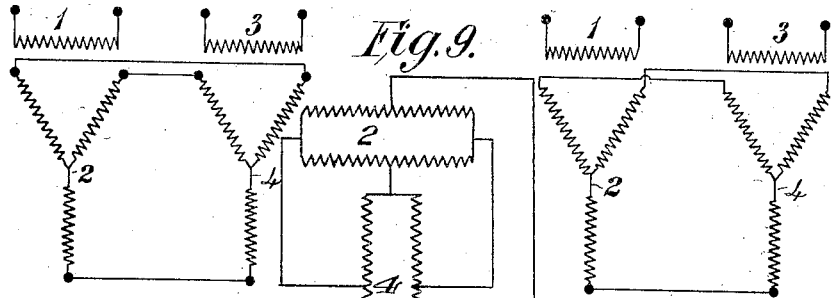
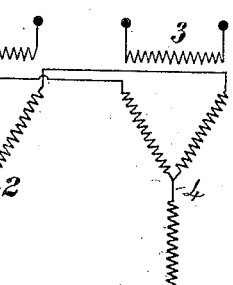
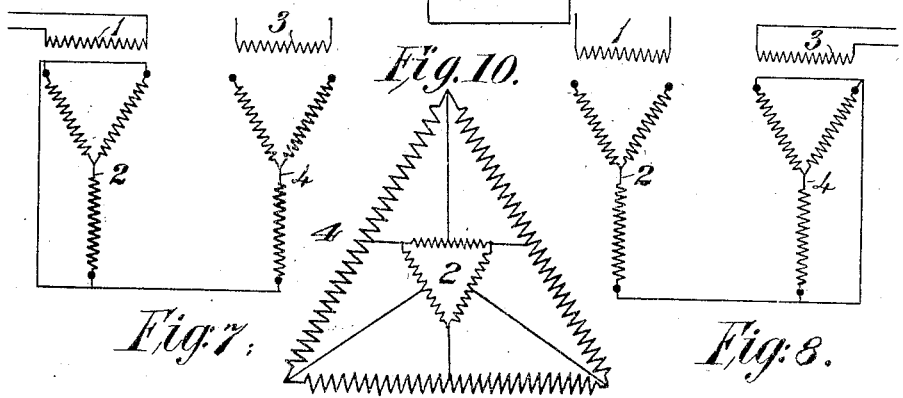
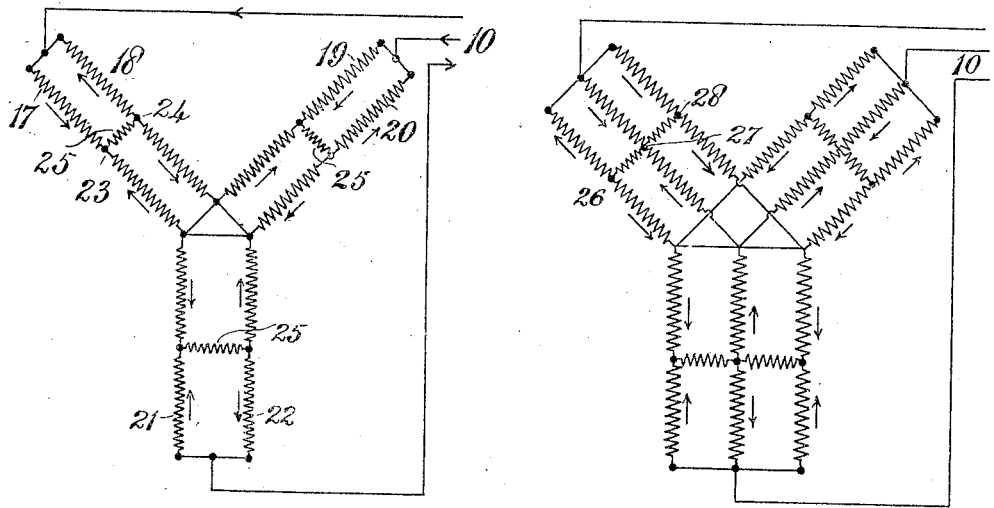
Witnesses
Edwin D. Bartlett
Albert W. Dealer
Inventor
Louis John Hunt
per Herbert Sefton Jones
Attorney L. J. HUNT.
DYNAMO ELECTRIC MACHINE.
APPLICATION FILED JUNE 22, 1906.
926,192.
Patented June 29, 1909.
4 SHEETS—SHEET 2.
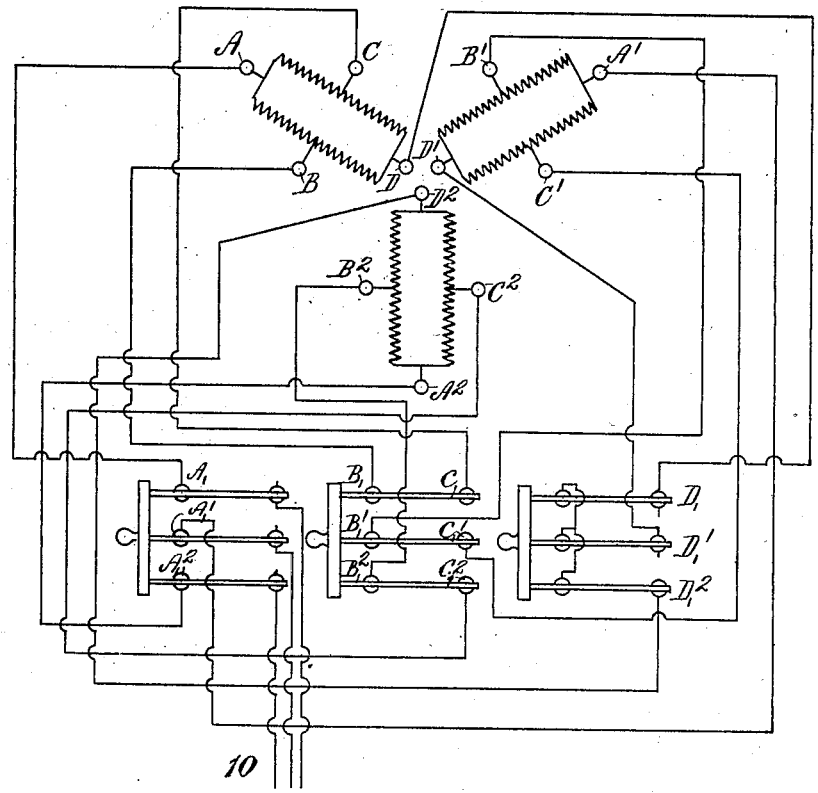
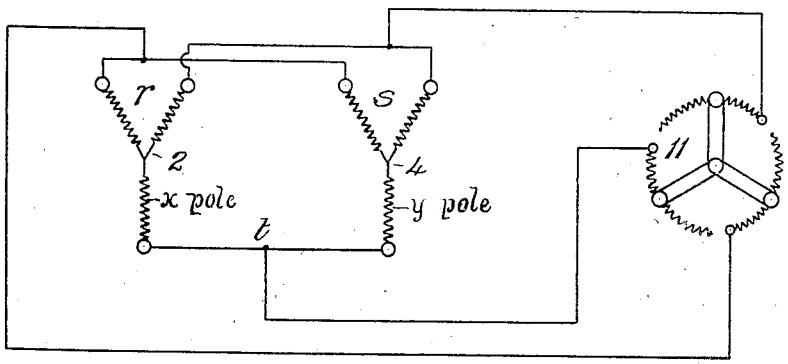
Fig. 3.
Witnesses
Edwin D. Bartlett
Walter F. N. Pook
Inventor
Louis John Hunt
per Hubert Sefton Jones
Attorney.

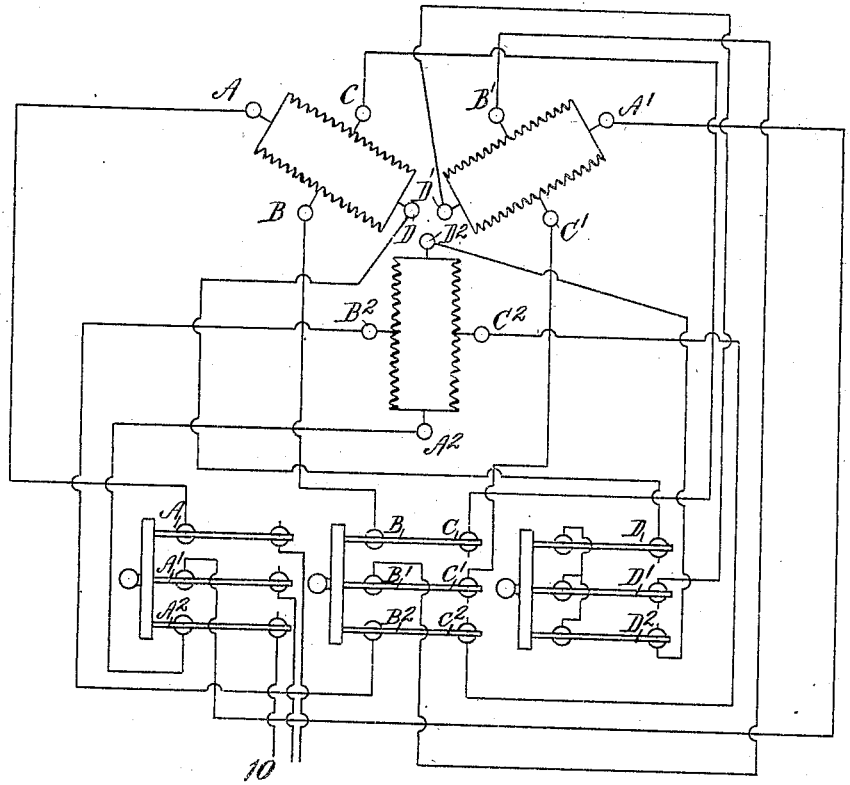
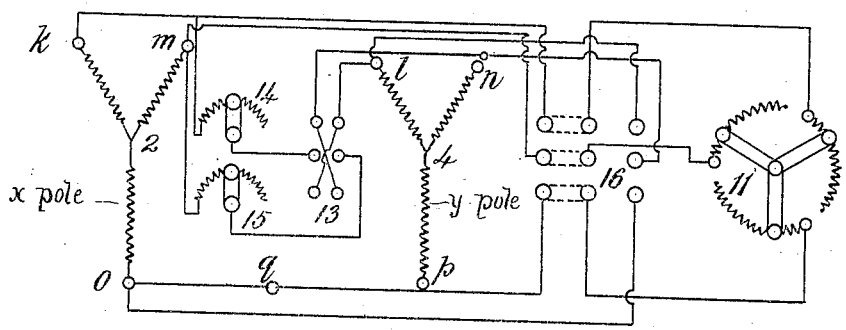
Fig. 4.

L. J. HUNT.
DYNAMO ELECTRIC MACHINE.
APPLICATION FILED JUNE 22, 1906.

926,192.

Patented June 29, 1909.
4 SHEETS—SHEET 4.

Witnesses
Walter G. Pook
E. D. Bartlett

Inventor
Louis John Hunt
per. Herbert Sefton Jones
Attorney.

UNITED STATES PATENT OFFICE.

LOUIS JOHN HUNT, OF RHYL, ENGLAND.

DYNAMO-ELECTRIC MACHINE.

No. 928,192.        Specification of Letters Patent.        Patented June 29, 1909.

Application filed June 22, 1906. Serial No. 322,879. REISSUED

*To all whom it may concern:*

Be it known that I, LOUIS JOHN HUNT, a subject of the King of Great Britain, residing at Conwy street, Rhyl, in the county of Flint, Great Britain, have invented new and useful Improvements in Dynamo-Electric Machines, of which the following is a specification.

In the employment of induction motors it is well known that a system of great flexibility is obtained by the use of two machines connected in cascade, because such an arrangement makes it possible to obtain a wide range of efficient speeds. Various proposals have been made with a view to obtaining the advantage of such a system with a less expense, these being directed to the combination of the two cascade connected motors into one machine. With this object inventors have devised machines carrying two or more windings on both the stator and rotor, the windings on each part being adapted to produce fields of different numbers of poles, so that each of the stator windings co-acts with one and only one of the rotor windings. Such machines, when brought into the best form hitherto known, have a serious disadvantage in the high self-induction, and consequent low power factor which results from the presence of the two stator windings. According to the present invention, therefore, this source of loss is avoided by providing on the stator a single compound winding, which is so interconnected as to be equivalent to two windings producing fields of different numbers of poles. By this means the single cascade motor is made a practical machine, since the power factor is substantially increased and moreover owing to the less length of end connections in the compound winding the resistance loss is largely reduced. Compound windings for producing fields of different numbers of poles have of course been previously employed in induction motors, but only with the purpose of first producing a field having one number of poles, and afterward, with or without a change of connections, producing a field having another number of poles, so that the two fields are not in existence at the same time. In such motors it is obviously only possible to obtain two speeds one corresponding to each number of poles, whereas in motors having two separate windings an additional speed is obtained by using the two windings cascade-connected, that is producing fields of both numbers of poles simultaneously. In order to obtain this additional speed with a compound stator winding, it is necessary that the currents producing one of the fields should flow through two or more parallel paths, so that the circuit for the currents producing the second field may be made or broken at will by the connection or disconnection of equipotential points in the circuit of the first field. (It will be understood that equipotential as here used, implies equipotential with respect to the currents producing the first field, for obviously the points will be no longer equipotential when the second field is being produced).

This invention consists therefore in the employment on the stator of an alternate current motor of a compound winding of this nature, having two or more parallel paths through which currents may flow to produce a field of a desired number of poles. Interconnections are provided by which equipotential points in this winding may be joined, thus completing circuits the currents in which will produce a field of another number of poles. Two separate windings may be employed on the rotor and means may be provided whereby the connections between the rotor windings may be reversed, so that in the one case the two rotor fields rotate in the same direction while in the other case they rotate in opposite directions. In this way, besides the three speeds obtained as above described, corresponding respectively to the two numbers of poles in the fields and to, say, the difference to the numbers, a further speed may be obtained corresponding to the sum of the two numbers of poles.

The invention is illustrated in the accompanying drawings in which—

Figures 1 and 2 show two types of the compound winding. Fig. 3 shows the motor having a compound winding of this type on its stator with three slip rings on the rotor. Fig. 4 shows a motor of the type shown in Fig. 3 but with five slip rings on the rotor instead of three. Figs. 5, 6, 7 and 8 indicate purely diagrammatically the changes of connections which can be obtained by means of the switching arrangements shown in Fig. 4. Figs. 9 and 10 show modified types of the compound winding. Fig. 11 shows the distribution and connection of the winding of Fig. 1 in a different manner.

To carry the invention into effect a stator winding of the kind illustrated diagrammatically in Fig. 1 or Fig. 2, is employed. In Fig. 1 there will be found parallel paths 17, 18, 19, 20, 21, 22, for the primary current which flowing through them produces a field of one number of poles, and symmetrically placed points like 23, 24 in these parallel windings are connected together either directly or through suitable resistances 25. This will provide the necessary local or independent circuits for the induced current which will flow so as to produce a field of the second number of poles. Of course as a physical fact the currents actually flowing in the windings would not be independent one from another but their resultant would be the sum of the primary and induced currents regarded as flowing independently in their respective portions of the windings. In some cases also it may be necessary to have three or more parallel windings arranged as in Fig. 2 for the primary currents in order that a sufficient number of local circuits may be closed by connecting the equipotential points 26, 27, 28 etc. in the primary winding to give a secondary winding having the required number of poles. It is understood of course that the equipotential points 26, 27, 28 here mentioned are again only at the same potential regarding the primary circuits as independent from the secondary circuits, while in actual running the points will not be at the same potential because the currents flowing in the directions indicated by the arrows will be the resultant of the primary and secondary currents in any particular portion of the winding. In Fig. 11 the winding of Fig. 1 is shown in a different manner so as to explain more fully the method of arranging and interconnecting the conductors. The winding illustrated is 3-phase, and produces four or eight poles. The direction of the currents supplied from outside is indicated by the crosses and dots within the circles which represent the conductors, while the direction of the induced currents is shown by the crosses and dots outside the circles.

In Figs. 3 and 4 is shown the application of a compound winding of the type above described to a motor which is designed to give a number of different speeds, and switches are provided for effecting in one of various possible ways the necessary changes of connections. The winding is of the three phase type and each phase has on it four tappings A, B, C, D, A′, B′, C′, D′, and A², B², C², D². These trappings are joined to the corresponding switch contacts $A_1$, $A_1'$, $A_1^2$, etc. In the position of the switches shown the tappings A, A′, A² are joined to the mains, the tappings B, B′, B² are joined to the tappings C, C′, C² and the tappings D, D′, D² are joined together. The winding, therefore, of the stator is exactly in the condition indicated by Fig. 1 except that the resistances 25 are replaced by short circuit connections. It will be obvious, however, that the resistances might be introduced between the tappings B, C etc. In this condition the winding acts as above described as two windings of different numbers of poles each co-acting with one of the rotor windings. When the slip-rings on the rotor are short-circuited the secondary winding joined thereto becomes inoperative, the points B, C etc. become equi-potential points and the winding acts as a simple one of say $x$ poles corresponding to the active rotor winding. The middle switch may now be opened without affecting the machine. By opening the switch which short circuits the tappings D, D′, D², reversing the middle switch so that it short circuits the tappings C, C′, C² and reversing the remaining switch so that the tappings B, B′, B² are joined to the mains, the connections of the compound winding are so altered that when the slip-rings are short-circuited it acts as a simple winding of $y$ poles.

In Fig. 3 the two rotor windings 2 and 4 are joined together and to three slip rings $r$, $s$, $t$, which may be short circuited by gradually cutting out the resistances 11. This motor, therefore, has three speeds apart from the variation of speed obtained by varying resistance 11. These speeds correspond to the three positions above described of the switches which control the stator winding. In the first position in which the winding is connected as shown in Fig. 1, the current supplied from the source of supply produces a field which acts upon the corresponding rotor winding. The current thus generated flows into the second rotor winding producing a field which reacts upon the compound stator winding. In the second and third positions only one of the rotor windings is active when the slip-rings are short circuited, the speeds obtained being those due to an $x$ pole and a $y$ pole induction motor respectively.

In Fig. 4 an extended range of speeds can be obtained because the speeds above named could be attained, while further provision is made in the switch 13 whereby the connections between two rotor windings can be reversed so that in the one case the speed of the motor corresponds to $x + y$ poles while in the other case it corresponds to $x - y$ poles. Resistance 11 serves as before to join together the three slip rings either those at $k$, $m$ and $q$ or those at $l$, $n$ and $q$ according to the position of the switch 16. The rheostats 14, 15 enable the slip rings at $k$ and $m$ to be joined to those at *l* and *n* first through resistance and afterward directly. With this arrangement the variations in speed described above can be obtained by connecting the stator winding in the manners mentioned and by cutting out the resistances 11 between the slip rings, this giving the connections shown diagrammatically by Figs. 7 and 8. When both rotor windings are to be made use of the corresponding slip rings *k*, *l*, *m*, *n*, may be connected together either directly or through resistances 14, 15 as indicated by Fig. 5.

Another speed can be obtained by connecting the slip rings in the order *k*, *n*, *m*, *l* which is done by reversing the switch 13, the effect of this being that the two magnetic fields created by currents circulating in the windings 2 and 4, will rotate in the same direction instead of as before in opposite directions. This arrangement is set out diagrammatically in Fig. 6. It is also possible to apply the same simplification of the windings to the rotor. For this purpose it is preferable to divide the windings into two or more groups, each group being so interconnected that when acted upon by the *x*-pole or *y*-pole field of the stator the sum of the E. M. F.'s generated in the windings of the group taken in order shall be *nil*. Such a system of connections for two phase windings is indicated in Fig. 9, and a similar arrangement for a three-phase mesh connected winding is shown in Fig. 10. In both these figures, as before, 2 and 4 are the rotor windings, or rather the parallel groups of the one winding and it will be seen that the mid-point of each generating conductor, or set of conductors in series, of the one group is connected to the junction of a pair of conductors or sets of conductors in the other group, this being an arrangement of connections which will give the above described effect. In each group of these windings currents are induced by, say, an *x*-pole field on the stator, and these currents flowing into the other group produce a *y*-pole field, which is able to react upon the stator. Thus for instance, where the rotor has in the normal construction four separate windings and the stator has a corresponding number of windings all so arranged that the machine is equivalent to four separate machines running in cascade, it becomes possible to use say two windings on the rotor in place of four, the other two windings for the induced currents being replaced by circuits closed across corresponding symmetrically arranged points in the primary windings just as shown for the stator windings in Figs. 1 and 2.

In all cases where the stator and rotor have each either two or more separate windings or the equivalent of these, the secondary rotor winding may be arranged to give a field rotating in the same direction as the field produced by the primary winding, for instance by the use of the switch 13 connected as in Fig. 4; in this case the machine will work as an induction motor having a number of poles equivalent to the difference between the number of poles of the secondary and primary rotor windings, whereas when the fields rotate in opposite directions the equivalent number of poles is the sum of the equivalent numbers for the conductive and inductive windings.

What I claim is:—

1. In a dynamo electric machine the combination of a stationary part and a rotating part, windings on one of said parts adapted to permit the flow of currents producing magnetic fields of two different numbers of poles, and windings on the other of said parts having a plurality of parallel paths adapted to allow of the flow of currents producing magnetic fields of two different numbers of poles.

2. In a dynamo electric machine the combination with a rotating part having separate windings adapted to permit of the flow of currents producing two magnetic fields of different numbers of poles, connections between said windings, and means for reversing said connections, of a stationary part and windings on said part having a plurality of parallel paths adapted to allow of the flow of currents producing magnetic fields of two different numbers of poles.

In testimony whereof I have signed my name to this specification in the presence of two subscribing witnesses.

LOUIS JOHN HUNT.

Witnesses:
EDWARD COMERFORD,
THOMAS HURTHWAITE DUTTON.